Oct. 12, 1965

J. G. ANDERSON 3,211,914

ELECTRIC POWER TRANSMISSION SYSTEM

Filed Oct. 9, 1961

2 Sheets-Sheet 1

Inventor,
John G. Anderson,
by Gilbert P. Tarleton
His Attorney.

United States Patent Office 3,211,914
Patented Oct. 12, 1965

3,211,914
ELECTRIC POWER TRANSMISSION SYSTEM
John G. Anderson, Dalton, Mass., assignor to General Electric Company, a corporation of New York
Filed Oct. 9, 1961, Ser. No. 143,630
6 Claims. (Cl. 307—3)

This invention relates to electric power transmission systems and more particularly to improvements in commercial frequency high voltage alternating current three phase systems of electric power transmission.

Most such systems include a transmission line having three-line conductors carried above ground on suitable towers from which each line conductor is insulated by suspension insulators for a predetermined voltage to ground, the air space between line conductors serving as the principal insulation for the so-called line to line voltage between them.

As the economy grows, many existing transmission systems are approaching the limit of their power transmitting capacity. Consequently, if such systems could be modified at reasonable expense to increase their power transmitting capacity such a modification should be of considerable value.

In accordance with the present invention, the power transmitting capacity of such existing conventional systems can be increased about 23% with no increase in line to ground voltage which the suspension insulators have been designed to withstand.

Looking at it from another point of view, the invention also makes it possible to design a transmission system for transmitting a given amount of power with about 11% lower line to ground voltage than would be necessary in a conventional system thus providing substantial savings in line costs.

These results are accomplished by introducing a proper amplitude triple frequency voltage bias between the system neutral and ground so as to modulate the system neutral by electrically oscillating it above and below ground potential at three times the system frequency.

An object of the invention is to improve electric power transmission systems.

Another object of the invention is to increase the power transmitting capacity of three phase electric power transmission systems having a given line voltage.

A further object of the invention is to reduce the voltage of a three phase line capable of transmitting a given amount of power.

The invention will be better understood from the following description taken in connection with the accompanying drawings and its scope will be pointed out in the appended claims.

Figure 1:
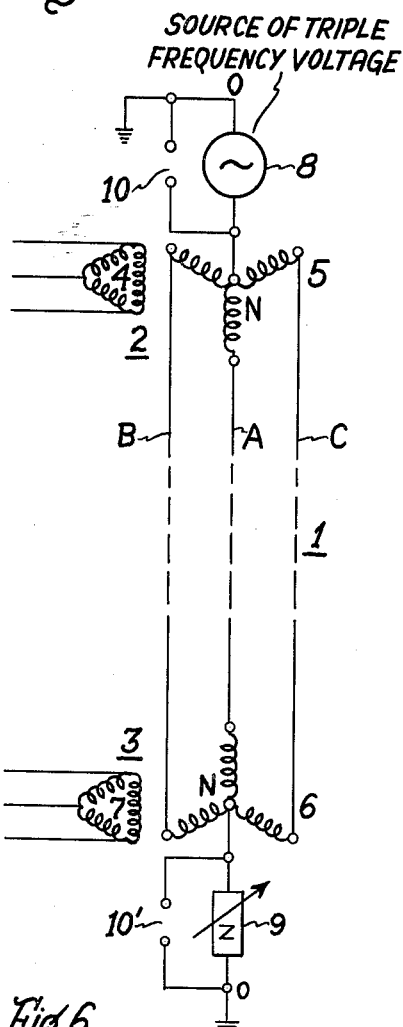
Figure 2:
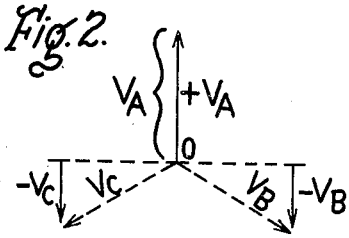
Figure 3:
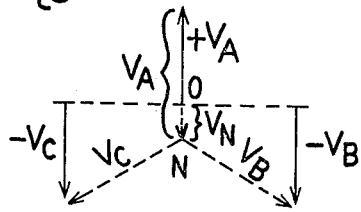
Figure 4:
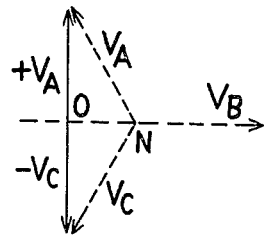
Figure 6:
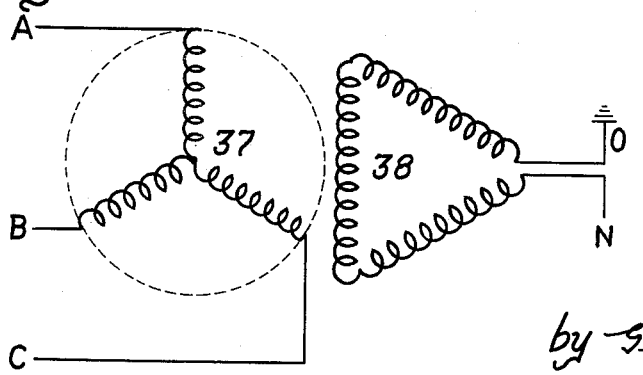
Figure 5:
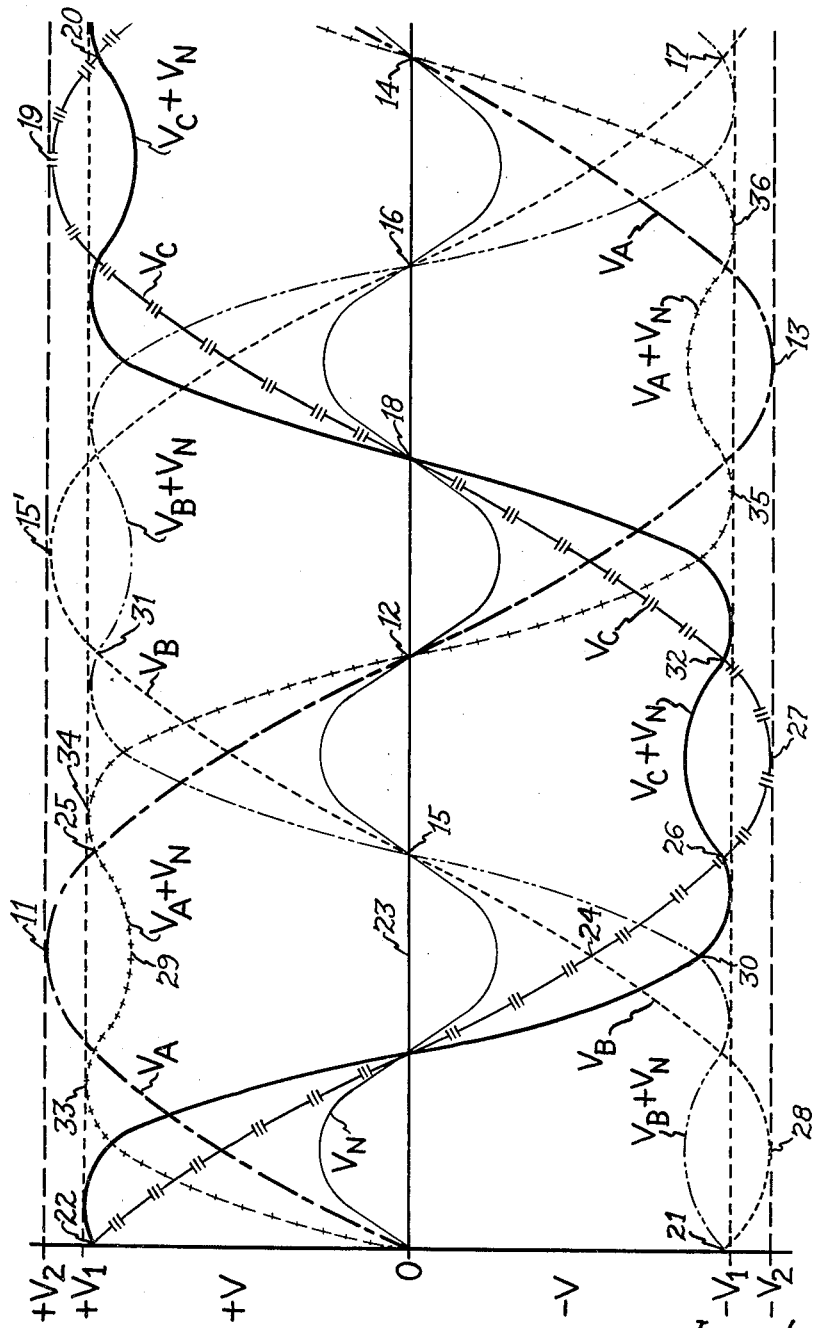

In the drawings:
FIGURE 1 is a diagrammatic illustration of an embodiment of the invention;
FIGURE 2, 3, and 4 are vector diagrams for explaining the operation of the invention;
FIGURE 5 is a set of graphs showing the variations of voltage with time for further explaining the invention; and
FIGURE 6 is a circuit diagram of a static device for converting balanced three phase voltage to single phase triple frequency voltage.

Referring now to the drawings, and more particularly to FIGURE 1, there is shown therein a three phase three conductor transmission line 1 for transmitting electric power between a sending station 2 and a receiving station 3. The line 1 consists principally of line conductors A, B, and C. The sending station 2 is shown as comprising a voltage step-up transformer having a low voltage winding 4 and a Y connected high voltage secondary winding 5 having a neutral point N. The receiving station 3 is shown as including a voltage step-down power transformer having a Y connected high voltage winding 6 with a neutral point N and a low voltage winding 7. Connected between the neutral N of the high voltage winding 5 and ground is a source of triple frequency voltage 8, and connected between the neutral N of the high voltage winding 6 and ground is an impedance 9 which preferably includes an inductance and also, if desired, a capacitance so as to constitute a high impedance to triple frequency currents but relatively low impedance to currents of fundamental frequency. The source 8 and the impedance 9 may be shunted by suitable overvoltage protective devices 10 and 10', respectively. As will be explained later, the impedance 9 may be another triple frequency voltage source similar to 8.

The operation of the invention can best be understood by reference to the vector diagrams and the graphs.

Referring to FIGURE 2, the vectors $V_A$, $V_B$ and $V_C$ represent respectively the voltages to neutral N of the three line conductors A, B, and C when no source 8 of triple frequency voltage is present. In this figure, the horizontal dashed line labeled "O" represents ground potential so that in FIGURE 2 the neutral is at ground potential as in a conventional system. In such a diagram, voltage to ground is measured vertically from the ground line or ground plane "O" so that in FIGURE 2 line A is at maximum potential to ground represented by $+V_A$, which equals $V_A$, and lines B and C are at half this voltage to ground negative represented by the solid vertical arrows labeled $-V_B$ and $-V_C$, which are half the length of $V_B$ and $V_C$, respectively. Thus at this instant, line conductor A is exerting twice the stress on its insulation to ground that conductors B and C are exerting.

Referring now to FIGURE 3, if a voltage $V_N$ is introduced between the neutral N and ground "O" equal in magnitude to one-fourth $+V_A$ in FIGURE 2, which is the same as one-half the magnitude of the voltages $-V_B$ and $-V_C$ in FIGURE 2, then the voltage to ground of all three line conductors, A, B, and C is the same in magnitude and equal to three-fourths of the phase voltages $V_A$, $V_B$ and $V_C$. Thus in FIGURE 3, $+V_A=V_A-V_N=V_A-¼V_A=¾V_A$; $-V_B=½V_B+V_N=½V_B+¼V_B=¾V_B$ and $-V_C=½V_C+V_N=½V_C+¼V_C=¾V_C$. Consequently, at this instant the insulation to ground of all three phase conductors of the line 1 will be equally stressed at three-fourths the maximum phase to neutral voltage of the system.

Referring now to FIGURE 4, this represents conditions which exist 30 electrical degrees or one-fourth of a cycle later than depicted in FIGURE 2. At this instant the voltage to ground of line B is zero and the voltages to ground of lines A and C are equal and opposite, the magnitude being .866 times the length of the voltage vectors $V_A$, $V_C$. In other words, the vertical arrows $+V_A$ and $-V_C$ represent respectively the voltages to ground of the conductors A and C. This is the condition for maximum voltage difference between the lines A and C. Under these conditions it is undesirable to introduce a biasing voltage between the neutral and ground "O" because this would make the voltage $+V_A$ and $-V_C$ unequal and thus would cause unequal stress on the insulation of the lines A and C.

If therefore, the biasing voltage $V_N$ in FIGURE 3, is made to have a frequency of three times the fundamental frequency of the system a 30 degree angular rotation of the main fundamental frequency vectors will correspond to a 90 electrical degree rotation of the triple frequency vector so that it will go from a maximum value to a zero value when the vector diagrams shown in FIGURES 2 and 3 rotate 30 electrical degrees to the position shown in FIGURE 4.

Referring now to FIGURE 5, this is a plot or graph of the voltage relationships with time, voltage being measured vertically from the point "O" representing ground potential and time being measured horizontally from the point "O" representing an arbitrary "O" time or start. Positive voltage with respect to ground is measured upwardly as represented by +V and negative voltages to ground are measured downwardly as represented by −V. The curve $V_A$ represents a sinusoidally varying voltage to ground of line conductor A which as shown starts with a zero value with respect to ground rises to a maximum at point 11, falls to "O" at point 12, increases to a maximum in the negative direction at point 13 and again returns to "O" at point 14, thus completing one full cycle, which is, of course, repeated indefinitely. Curve $V_B$ represents the voltage to ground of conductor B which one-third of a cycle later at point 15 passes through "O" and increases in the positive direction to a maximum at point 15′ then falls to "O" at point 16 and increases in a negative direction to point 17, corresponding in time to point 14, where its value in the negative direction is .866 of its maximum value. Likewise curve $V_C$ is the voltage of conductor C which at two-thirds of a cycle after time "O" and one-third of a cycle after point 14 passes through "O" at point 18 increasing in a positive direction up to a maximum at point 19 and then decreases until at point 20, corresponding to point 14, its value is .866 of its maximum value. It will also be seen that at time "O" voltage $V_B$ at point 21 is at a value of .866 of its maximum value in the negative direction and voltage $V_C$ is at point 22 corresponding to .866 of its maximum value in the positive direction.

Conditions corresponding to FIGURE 2 are represented at point 23 on the horizontal time scale and it will be seen that at this instant $V_A$ is at its maximum value at point 11 in the positive direction and voltages $V_B$ and $V_C$ are equal to each other and at a negative value of one-half of $V_A$, this point being indicated at 24 where the curves $V_B$ and $V_C$ intersect.

Likewise, conditions represented by FIGURE 4 are shown at time point 15 where $V_B$ is zero, $V_A$ is at point 25 where its value is .866 of its maximum positive value and $V_C$ is at point 26 where its value is .866 of its maximum negative value which occurs at point 27 and corresponds in magnitude to point 13 for $V_A$ and also to point 28 for $V_B$.

The triple frequency voltage $V_N$ is also shown in FIGURE 5. This has a peak or maximum value of one-fourth the peak or maximum values of the voltages $V_A$, $V_B$, $V_C$. Curve $V_A + V_N$ illustrates the effect of $V_N$ on $V_A$. Thus at time 23 when $V_A$ is a maximum at point 11 $V_A + V_N$ is at 29 having a value of +.75 the voltage of point 11. Likewise at this same instant of time point 24 has in effect been shifted in a negative direction to point 30 by one-fourth the maximum phase to ground voltage so that point 30 is at a value negative equal to .75 the maximum phase to ground voltage and consequently the magnitude of the voltage at points 29 and 30 with respect to ground is equal. This corresponds to conditions represented by FIGURE 3. Due to the symmetry of the curves for all three phases also the same relationships also exist at corresponding times in their particular cycles so that for example at time 12 when $V_A$ is zero $V_N$ is also zero so that $V_B$ equals $V_B + V_N$ at a value of .866 of the maximum, this point being indicated at point 31 where curves $V_B$ and $V_B + V_N$ intersect, the corresponding point being indicated at 32 for phase C.

As will be seen in FIGURE 5, the resultant of the line to ground voltage of each phase and the triple frequency voltage $V_N$ has a pair of maximum points at slightly higher voltage than the .866 value and which points are displaced from the maximum point of the phase to ground voltage by about 40 electrical degrees whereas the .866 points represented by 25, 26, 31 and 32 are displaced from the maximum points by about 30 electrical degrees. These maximum values are indicated in the case of phase A by the points 33 and 34 for the positive half cycle and points 35 and 36 for the negative half cycle. These maximum values of the resultant voltages to ground are about .891 of the maximum voltages to ground.

As the voltage $V_N$ has exactly the same phase relation to each of the voltages $V_A$, $V_B$ and $V_C$, it does not in any way change the line to line voltages. In other words, the vertical distance between the phase to ground voltages of any two phases at any given instant is the same as the vertical distance at the same instant between the resultant voltages to ground of those phases which are modified by $V_N$. Consequently the line to line voltages, which are the power transmitting voltages in the system shown in FIGURE 1, remain sinusoidal. This is also apparent from a consideration of FIGURE 3 in which the effect of $V_N$ is merely to rotate the neutral point N around the point "O" at three times the speed the whole diagram is rotating without in any way affecting the voltage difference between $V_A$, $V_B$, $V_C$.

Consequently a transmission line designed to have a maximum voltage level of $V_1$ corresponding to the voltage of points 33, 34, 35, 36 can with the present invention be operated at an effective voltage level of $V_2$ corresponding to points 11, 15, 19, 27 and 28 representing about an 11% increase in effective voltage and as power transmitted by a system is proportional to the square of the voltage this represents about a 23% increase in power transmitting ability. Likewise if it is desired to construct a transmission system for transmitting the amount of power which can be transmitted with the voltage $V_2$ the use of the present invention will permit the construction of a less costly line having the lower voltage level of $V_1$.

Any suitable source of the triple frequency neutral modulating voltage may be employed. For example, a frequency tripling transformer such as shown in FIGURE 6 may be employed. This transformer has a Y connected primary winding 37 whose terminals may be connected to the phase conductors A, B and C in FIGURE 1 and an open corner delta secondary winding 38 whose terminals are connected respectively to the "O" or ground point and to the neutral point N. The theory and operation of such a frequency tripling transformer is described in an article entitled, "Frequency Tripling Transformer" by J. L. Cantwell, published in the July 1936 issue of Electrical Engineering, page 784. However, any other source of the triple frequency neutral biasing voltage can also be employed such as a separate generator or generator winding coupled directly to the main generator (not shown) which supplies power to the low voltage primary winding 3.

One purpose of the impedance 8 in FIGURE 1 is to limit the effective triple frequency current which can return through ground to the current required to charge the transmission line at the triple frequency voltage. Normally this is a very small proportion of the load current.

The purpose of the gaps 10 and 10′ is to limit the neutral voltage in case of line to ground faults. These gaps obviously can also be normally open circuit breakers if desired.

The low voltage transformer windings 4 and 7 in FIGURE 1 are shown delta connected for effectively preventing any triple frequency from getting into the generating or load circuits to which they are connected and consequently any such currents and voltages will be confined to the transmission line itself.

Up to this point it has been tacitly assumed that the triple frequency voltage $V_N$ is in phase with the fundamental frequency phase voltages $V_A$, $V_B$, $V_C$ at all points along the line in the sense that it passes through zero in the same direction whenever and wherever they do. However, depending on the line impedance and the magnitude and power factor of the fundamental frequency load current there can be a phase shift or displacement between the sending and receiving end fundamental frequency voltages of the transmission line. If this fundamental frequency voltage phase shift is appreciable and there is no equivalent phase shift in the triple frequency voltage they will not stay in phase all along the line so that the full benefits of the invention will not be attained all along the line. However, this can easily be corrected in a number of ways. For example, the impedance 9 can be proportioned or adjusted to allow triple frequency currents of the proper amplitude and power factor to flow in the line conductors so as to cause such a phase shift in the triple frequency voltage along the line as to keep the triple and fundamental frequency voltages in phase along the line. Another way would be to use a second triple frequency voltage source, like the transformer of FIG. 6, for the impedance 9 at the receiving end of the line. This would insure that the triple frequency voltage was in phase with the fundamental frequency voltages at the receiving, as well as the sending, end of the line and in fact all along the line due to the circulating triple frequency current which would be caused to flow through the line and ground by the vector difference between the phase displaced triple frequency voltages at opposite ends of the line. Still another way would be to shift the phase of the triple frequency source so that it is in phase with the fundamental frequency voltages at say the middle of the line. It would then be out of phase with the fundamental frequency voltages at the ends of the line by only one and a half instead of three times the angular displacement between the latter. Such a phase shift can easily be obtained by adjusting the driving connection between the main source of fundamental frequency and the source of triple frequency. For example, in the case of the frequency tripling transformer of FIG. 6, the windings 37 and 38 can be made relatively rotatable as in a conventional three phase induction voltage regulator in which one of them is on a rotor and the other is on a stator. This is shown schematically in FIG. 6 when the winding 37 is indicated as being rotatable relative to winding 38. Adjusting the angular relation between them will shift the phase of the output relative to the input.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. A three phase electric power transmission system comprising, in combination, a sending station having a voltage step-up power transformer with a Y connected high voltage secondary winding, a receiving station with a voltage step-down power transformer having a Y connected high voltage primary winding, a high voltage transmission line having three line conductors respectively interconnecting corresponding phases of said high voltage windings, means for inserting a single phase alternating voltage between the neutral point of at least one of said Y connected windings and ground of a frequency triple the frequency of the fundamental frequency of said systems and of an amplitude no greater than about one-fourth the amplitude of the phase voltages of said high voltage windings, the phase of said triple frequency voltage relative to the individual phase voltages of said high voltage windings being such that it is in phase opposition to the latter when they are at their maximum values, and an impedance connected between the neutral point of the other Y connected winding and ground.

2. A three phase electric power transmission system comprising, a pair of spaced Y delta connected power transformers the phases of whose Y connected windings have equal and substantially higher voltages than the phases of the delta connected windings, a transmission line interconnecting said Y connected windings, said system having a neutral corresponding to the neutral points of said Y connected windings and means for impressing an alternating single phase voltage between said neutral and ground of triple the frequency of said system and no more than about one fourth the amplitude of the phase voltages of said Y connected windings and in phase with said voltages, said means being connected between the neutral of one of said Y connected windings and ground, an impedance connected between the neutral of other Y connected winding and ground, said impedance having a higher value at the triple frequency than at the frequency of said system, and overvoltage protective means connected between each of said neutrals and ground.

3. In a high voltage three phase electric power transmission system, a pair of terminal stations each comprising a power transformer with a high voltage Y connected winding, a transmission line having separate conductors respectively interconnecting corresponding phases of said Y connected windings, means for modulating the neutral of said system relative to ground comprising a source of single phase voltage of triple the frequency and a small fraction of the amplitude of the phase voltages of said system connected between the neutral of one of said Y connected windings and ground, and means comprising an impedance connected between the neutral of the other Y connected winding and ground for keeping said single phase and three phase voltages in phase along said line.

4. In a high voltage three phase electric power transmission system, a pair of terminal stations each comprising a power transformer with a high voltage Y connected winding, a transmission line having separate conductors respectively interconnecting corresponding phases of said Y connected windings, means for modulating the neutral of said system relative to ground comprising a source of single phase voltage of triple the frequency and a small fraction of the amplitude of the phase voltages of said system, and means for shifting the phase of said triple frequency single phase voltage relative to the phase voltages of said system.

5. The system of claim 3 in which said small fraction is one-fourth.

6. The system of claim 4 in which said small fraction is one-fourth.

References Cited by the Examiner
UNITED STATES PATENTS

| | | | |
|---|---|---|---|
| 1,363,707 | 12/20 | Beard | 307—3 |
| 2,745,991 | 5/56 | Seymour | 307—73 |

MILTON O. HIRSHFIELD, *Primary Examiner.*

LLOYD McCOLLUM, *Examiner.*